(No Model.) 2 Sheets—Sheet 1.
J. STEHLI.
PROCESS OF MAKING SCREWS.
No. 455,931. Patented July 14, 1891.
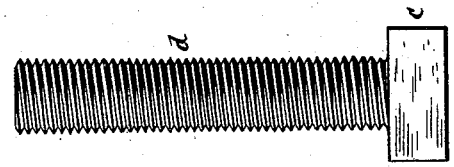 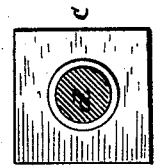
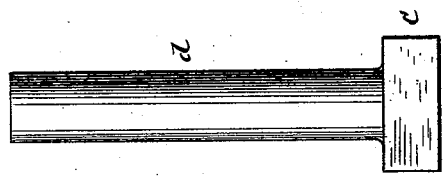 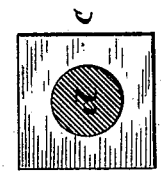
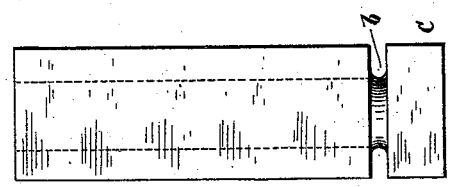 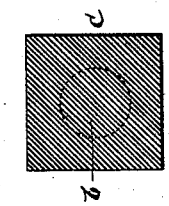
 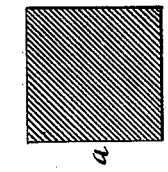
WITNESSES: INVENTOR
Jacob Stehli
BY
ATTORNEYS.

(No Model.) 2 Sheets—Sheet 2.
J. STEHLI.
PROCESS OF MAKING SCREWS.
No. 455,931. Patented July 14, 1891.
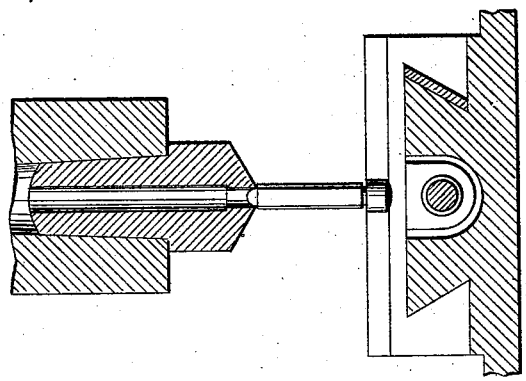
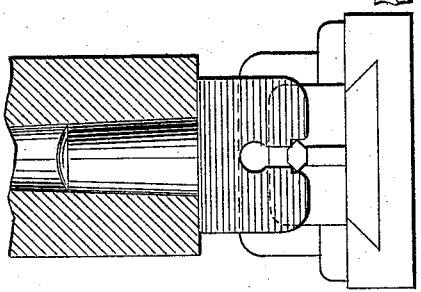
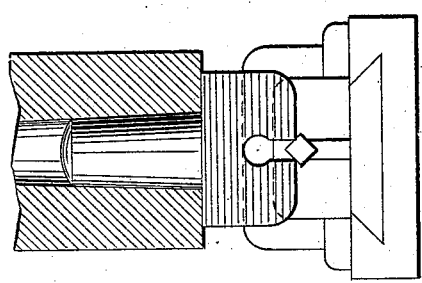
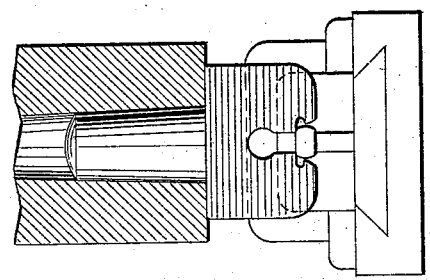
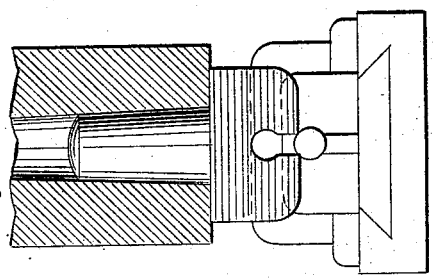
WITNESSES:
A. Schehl.
Carl Kay
INVENTOR
Jacob Stehli
BY
Gorrell & Raegener
ATTORNEYS.

UNITED STATES PATENT OFFICE.

JACOB STEHLI, OF HARTFORD, CONNECTICUT.

PROCESS OF MAKING SCREWS.

SPECIFICATION forming part of Letters Patent No. 455,931, dated July 14, 1891.

Application filed October 1, 1888. Serial No. 286,882. (No model.)

*To all whom it may concern:*

Be it known that I, JACOB STEHLI, of Hartford, in the county of Hartford and State of Connecticut, have invented certain new and useful Improvements in Processes of Making Screws, of which the following is a specification.

This invention relates to an improved process of making metal screws, such as machine-screws, wood-screws, and the like.

The object of this invention is to economize the expense incident to the production of screws.

In the accompanying drawings, Figure 1 represents a side elevation of the blank from which the screw is made. Fig. 2 is a side elevation of the blank, showing it in the second step of my process. Fig. 3 is a side view representing the third step, and Fig. 4 a side view of the screw after threading the same. Figs. 5 to 8 represent horizontal sections of the different blanks shown in Figs. 1 to 4. Figs. 9, 10, 11, 12, and 13 represent sectional side elevations of a series of dies by which the shank of the blank is successively reduced in thickness; and Figs. $9^a$, $10^a$, $11^a$, $12^a$, and $13^a$ are vertical transverse sections representing the blank in different stages of reduction.

Similar letters of reference indicate corresponding parts.

In carrying my process of making screws into practice the blanks $a$, of the required length, are cut off from metal rods having the thickness required for the size of the screws. These blanks may be cut from rods of round, square, hexagonal, or other cross-section, according to the shape desired to be imparted to the heads of the screws. An annular head-forming groove $b$ is next cut into the blank at that end at which the head of the screw is to be formed, said groove being of a depth corresponding to the thickness of the shank of the screw. If the top of the head $c$ is to be rounded off, this curvature is imparted simultaneously with the groove by a suitable cutter. The blank $a$ is then subjected to the reducing action of a series of drop-dies, as shown in Figs. 9 to 13, by which the thickness of the shank is successively reduced, as shown in Figs. $9^a$ to $13^a$, so that the surplus stock is cut off and a shank $d$ produced, the thickness of which is equal to the depth of the annular head-forming groove $b$. The shank $d$ is then exposed to the action of a screw-threading machine of any approved construction, and finally the head finished by cutting the nick.

The advantage of my improved process of making screws consists, mainly, in the time gained by the reducing drop-dies as compared to the slower method of reducing the shank to the required thickness by a turning-off cutter. This step forms the essential feature of my invention, as the screws can thereby be manufactured at a considerable saving in time and labor as compared with the methods of making screws heretofore in use.

Having thus described my invention, I claim as new and desire to secure by Letters Patent—

1. That improvement in the art of making screws which consists in cutting an annular head-forming groove near one end of a metal blank and then subjecting that portion of the blank below said groove to a succession of drop-cutting operations, substantially as described.

2. That improvement in the art of making screws which consists in subjecting a metal blank to a succession of drop-cutting operations and then threading the so-produced shank, substantially as described.

3. The method for making screws, which consists in forming a blank of the required size for the screw to be produced, then cutting an annular groove therein, then subjecting that portion of the blank below said groove to a succession of drop-cutting operations, and then threading the so-reduced portion of the blank, substantially as described.

In testimony that I claim the foregoing as my invention I have signed my name in presence of two subscribing witnesses.

JACOB STEHLI.

Witnesses:
PAUL GOEPEL,
JOHN A. STRALEY.